(12) United States Patent
Magri et al.

(10) Patent No.: US 10,491,293 B2
(45) Date of Patent: Nov. 26, 2019

(54) PROTECTION APPARATUS FOR A BIDIRECTION OPTICAL LINK

(71) Applicant: Telefonaktiebolaget LM Ericsson (publ), Stockholm (SE)

(72) Inventors: Roberto Magri, Pisa (IT); Alberto Deho, Genoa (IT); Fabio Falconi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/769,114

(22) PCT Filed: Feb. 1, 2016

(86) PCT No.: PCT/EP2016/052082
§ 371 (c)(1),
(2) Date: Apr. 18, 2018

(87) PCT Pub. No.: WO2017/071827
PCT Pub. Date: May 4, 2017

(65) Prior Publication Data
US 2018/0316418 A1   Nov. 1, 2018

Related U.S. Application Data

(60) Provisional application No. 62/248,794, filed on Oct. 30, 2015.

(51) Int. Cl.
*H04B 10/032* (2013.01)
*H04J 14/02* (2006.01)
*H04Q 11/00* (2006.01)

(52) U.S. Cl.
CPC .......... *H04B 10/032* (2013.01); *H04J 14/029* (2013.01); *H04J 14/0282* (2013.01);
(Continued)

(58) Field of Classification Search
CPC ............. H04B 10/032; H04Q 11/0005; H04Q 2011/0016; H04Q 2011/0043; H04J 14/0282; H04J 14/029
See application file for complete search history.

(56) References Cited

U.S. PATENT DOCUMENTS 5,510,917 A * 4/1996 Corke ................. H04B 10/077
398/34
2005/0180316 A1   8/2005 Chan

FOREIGN PATENT DOCUMENTS

CN    101043272 A    9/2007
CN    102106103 A    6/2011
CN    102377486 A    3/2012

OTHER PUBLICATIONS

Chinese Search Report—201680077305.X—dated Apr. 26, 2019—4 Pages.

* cited by examiner

*Primary Examiner* — Leslie C Pascal
(74) *Attorney, Agent, or Firm* — Sage Patent Group (57) ABSTRACT

According to embodiments of the present disclosure, apparatus is provided for protecting an optical link arranged to carry upstream optical signals and downstream optical signals. The apparatus comprises a first detector arranged to selectively detect a downstream optical signal received at a second port having a first wavelength and a second detector arranged to selectively detect a downstream optical signal received at the second port having a second wavelength different from the first wavelength. The apparatus further comprises control circuitry arranged to cause a protection switch to selectively couple a third port to the second port instead of to the first port based on the detecting by the first detector and the second detector. Also provided is a second apparatus for protecting the optical link. The second appa-
(Continued)

ratus comprises a bypass element arranged to selectively direct at least a portion of an upstream optical signal at the first wavelength, received at a fourth port, such that a downstream optical signal at the first wavelength is transmitted from a fifth port.

16 Claims, 7 Drawing Sheets

(52) U.S. Cl.
CPC . *H04Q 11/0005* (2013.01); *H04Q 2011/0016* (2013.01); *H04Q 2011/0043* (2013.01)

PROTECTION APPARATUS FOR A BIDIRECTION OPTICAL LINK

TECHNICAL FIELD

The present disclosure relates to apparatus for protecting an optical link arranged to carry upstream optical signals and downstream optical signals, to a second apparatus for protecting the optical link, and to a system comprising the apparatus and the second apparatus. The present disclosure also relates to an optical network, and to a radio access network comprising the optical network.

BACKGROUND

Using a single optical link, rather than separate optical links, to carry upstream optical signals and downstream optical signals may be more cost efficient. This is not only because fewer optical fibres are required in order to transport the optical signals, but also because fewer associated components such as splitters, couplers and splice enclosures may be required. Moreover, upgrading existing or "dark" optical fibre installations for single fibre working (i.e. to carry upstream optical signals and downstream optical signals) may advantageously enable capital and labour costs to be reduced, by making more efficient use of existing fibre installations and thus extending the "time to trench" when additional optical fibres must be laid.

However, being able to "protect" an optical link, whereby the upstream optical signals and downstream optical signals may still be conveyed in the event of an optical fibre cut, or other damage, is very important for a variety of applications.

Figure 1:
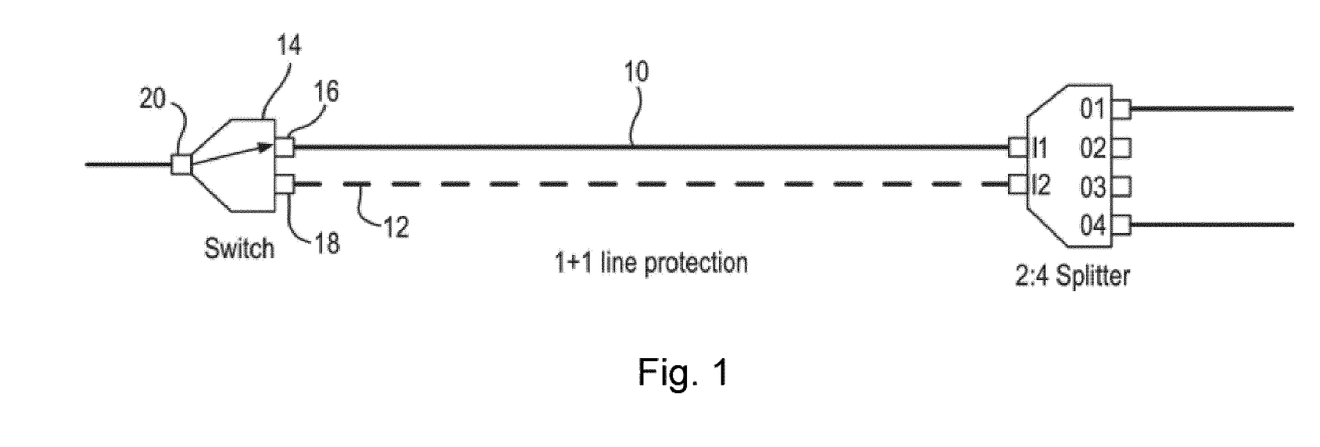
FIG. 1 illustrates a conventional 1+1 protection apparatus for an optical link.

FIG. 1 illustrates a conventional 1+1 protection apparatus for an optical link 10 which is arranged to carry upstream optical signals only (i.e. optical signals travelling in a single direction). The protection apparatus comprises a first port 16 for coupling to the optical link 10. The protection apparatus further comprises a second port 18 for coupling to a further optical link 12, which may be referred to as a protection optical link. The protection apparatus further comprises a third port 20 for receiving upstream optical signals for transmission over the optical link 10. In addition, the protection apparatus comprises a protection switch 14 operable to selectively couple the third port 20 to the second port 18 instead of to the first port 16; i.e. to cause the upstream optical signals to travel over the further optical link 12, instead of over the optical link 10, for example if an optical fibre cut or other damage is detected.

In order to detect such optical link damage, an optical power detector (not shown) is arranged to monitor the optical power received at the first port 16 from the optical link 10. In the event of an optical fibre cut or other damage a significant portion of the upstream optical signals, transmitted from the first port 16, will be reflected back from the cut interface or otherwise damaged optical link portion, and received at the first port 16. Thus, if the optical power detector detects optical power at a level greater than a threshold (indicating reflection at a power greater than during normal operation), then in response a control signal may be triggered to cause the protection switch 14 to couple the third port 20 to the second port 18, instead of to the first port 16.

Thus, in this way, protection of the optical link 10 may be provided in a simple, cost effective and reliable way. If the protection system were a 1:1 protection system, the remote unit may also detect failure of the optical link, simply by detecting loss of signal of the upstream optical signals, received at the remote unit.

SUMMARY

Figure 2:
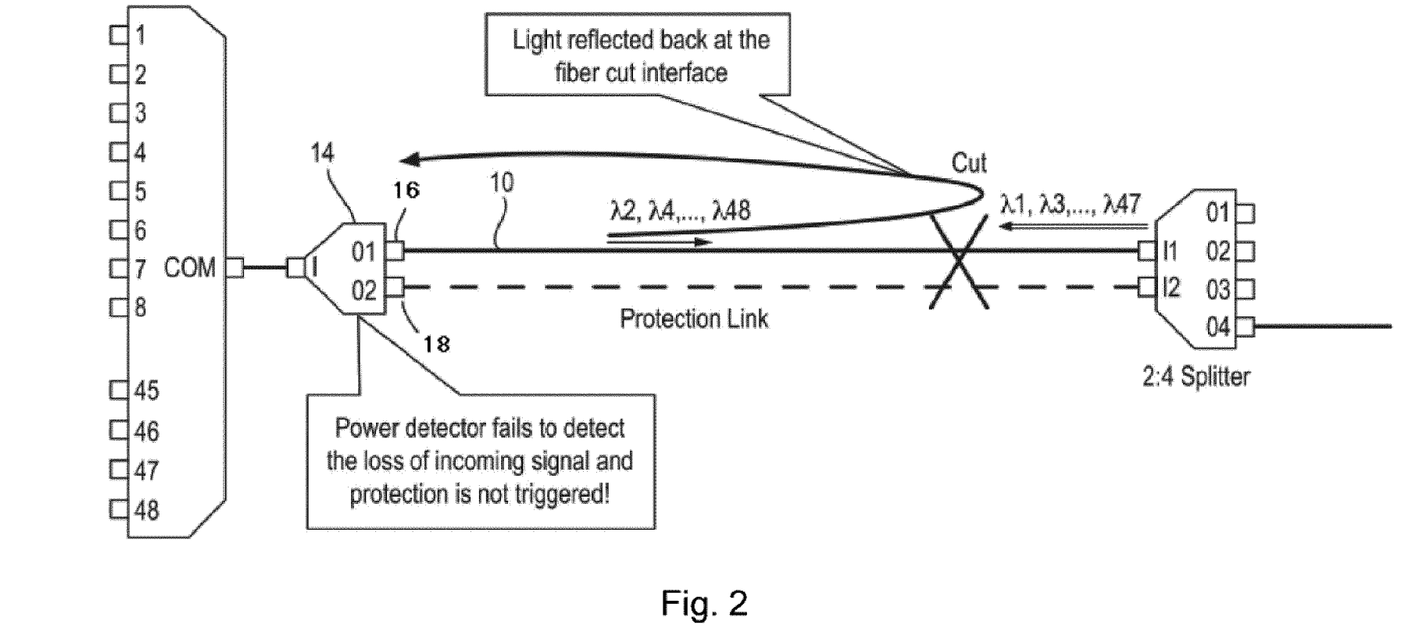
FIG. 2 illustrates why the protection apparatus shown in FIG. 1 fail if the optical link is arranged to carry downstream optical signals as well as upstream optical signals.

The Applicant has appreciated that this protection system cannot work for an optical link which is arranged to carry downstream optical signals as well as upstream optical signals (i.e. optical signals travelling in opposite directions). This is because, as illustrated in FIG. 2, if for example the optical link 10 is cut or otherwise damaged, not only will the upstream optical signals be reflected back from the damaged portion to the first port 16, but the downstream optical signals will not pass along the length of the optical link 10, and thus reach the first port 16. Thus, the net effect at the optical power detector (again not shown) may be that there is no appreciable change in the optical power detected: any increase of power owing to the reflections may be cancelled out by the loss of power caused by the downstream optical signals not reaching the first port 16. Alternatively, if there is some difference, for example because there are more upstream optical signals than downstream optical signals, it may be difficult to perform the necessary threshold calibration. Moreover, this threshold calibration would need to be adjusted each time network parameters, such as optical signal transmission power and the number of upstream optical signals and downstream optical signals, are changed.

One solution may be inserting an interleaver (a form of wavelength splitter), to separate the reflected upstream optical signals and downstream optical signals received at the first port 16, based on their respective wavelengths (e.g. in many networks the upstream optical signals may have even wavelengths, illustrated in FIG. 2 as even lambdas 2 to 48, and the downstream optical signals may have odd wavelengths, illustrated in FIG. 2 as odd lambdas 1 to 47, or vice versa). This way the power of the reflected upstream optical signals and the downstream optical signals can be detected separately. However, a problem with this solution is that an interleaver is an expensive component since tight isolation specifications are required. In addition, this solution may not allow reconfiguration of the network wavelength plan, which may result in less efficient operation of the network.

The Applicant has appreciated that it would be desirable to provide an alternative system for protecting an optical link arranged to carry upstream optical signals and downstream optical signals.

According to one aspect of the present disclosure, apparatus is provided for protecting an optical link arranged to carry upstream optical signals and downstream optical signals. The apparatus comprises a first port for coupling to the optical link. The apparatus further comprises a second port for coupling to a further optical link. The apparatus further comprises a third port for receiving upstream optical signals for transmission over the optical link and for outputting downstream optical signals received over the optical link. The apparatus further comprises a protection switch operable to selectively couple the third port to the second port instead of to the first port. The apparatus further comprises an optical signal generator arranged to generate an upstream optical signal at a first wavelength. When the third port is coupled to the first port, the first port is arranged to output said upstream optical signal. The apparatus further comprises a first detector arranged to selectively detect a downstream optical signal received at the second port having the first wavelength. The apparatus further comprises a second detector arranged to selectively detect a downstream optical signal received at the second port having a second wavelength different from the first wavelength. The apparatus further comprises control circuitry arranged to cause the protection switch to selectively couple the third port to the second port instead of to the first port based on the detecting by the first detector and the second detector.

Advantageously, embodiments of the present disclosure enable protection of an optical link arranged to carry both upstream optical signals and downstream optical signals, in a cost effective and reliable manner—in particular since, as the detection of the downstream signals is over the further optical link (whilst traffic is transmitted over the optical link), this detection is advantageously not affected by upstream signal reflections. Another advantage is that since we can 'choose' the first wavelength, we can select a wavelength in a different band from the downstream and upstream signals carrying traffic. This makes the first detector much simpler and cheaper than the interleaver. Further, advantageously, the wavelength plan can be independent of the protection scheme.

In an embodiment, the control circuitry may be arranged to cause the protection switch to selectively couple the third port to the second port instead of to the first port, if: the first detector does not detect an optical signal at the second port having the first wavelength; and the second detector detects an optical signal at the second port having the second wavelength.

In an embodiment, the control circuitry may be further arranged to determine that there is a fault on the further optical link if: the first detector does not detect an optical signal at the second port having the first wavelength and the second detector does not detect an optical signal at the second port having the second wavelength. The control circuitry may be further arranged to determine that there is no fault on the further optical link and that no downstream optical signal having the second wavelength is received over the further optical link if: the first detector detect an optical signal at the second port having the first wavelength and the second detector does not detect an optical signal at the second port having the second wavelength.

In an embodiment, the first detector may comprise a first wavelength filter configured to selectively filter the first wavelength and a first optical power detector. The second detector may comprise a second wavelength filter configured to selectively filter the second wavelength and a second optical power detector.

In an embodiment, the optical signal generator may be a laser. The optical signal generator may be arranged such that the upstream optical signal having the first wavelength passes via the protection switch, whereby, when the third port is coupled to the second port instead of the first port, the upstream optical signal is output from the second port. This means that, advantageously, the same upstream optical signal may be used to detect whether there is a fault on the optical link (when the further optical link is the "working link").

In an embodiment, the apparatus may further comprise a third detector arranged to selectively detect a downstream optical signal received at the first port having the first wavelength and a fourth detector arranged to selectively detect a downstream optical signal received at the first port having the second wavelength different from the first wavelength. The control circuitry may be further arranged to cause the protection switch to selectively couple the third port to the first port instead of to the second port based on the detecting by the third detector and the fourth detector.

According to another aspect of the present disclosure, a second apparatus is provided for protecting an optical link arranged to carry upstream optical signals and downstream optical signals. The second apparatus comprises a fourth port for coupling to an end of the optical link. The second apparatus further comprises a fifth port for coupling to an end of a further optical link. The second apparatus further comprises one or more sixth ports for outputting upstream optical signals received over the optical link and for receiving downstream optical signals for transmission over the optical link. The second apparatus further comprises a bypass element arranged to selectively direct at least a portion of an upstream optical signal at a first wavelength, received at the fourth port, such that a downstream optical signal at the first wavelength is transmitted from the fifth port. The second apparatus is further arranged to simultaneously transmit the downstream optical signals received at the sixth port from the fourth port and from the fifth port, wherein the downstream optical signals include a downstream optical signal at a second wavelength different from the first wavelength.

In an embodiment, the second apparatus may further comprise a power splitter configured to split the downstream optical signals received at the one or more sixth ports such that the downstream optical signals are transmitted from the fifth port as well as from the fourth port.

In an embodiment, the bypass element may be further arranged to selectively direct at least a portion of an upstream optical signal at a first wavelength, received at the fifth port, such that a downstream optical signal at the first wavelength is transmitted from the fourth port. This may be useful in detecting whether there is a fault on the optical link in the event that the further optical link becomes the "working link" and hence the optical link becomes the "protection link". The bypass element may comprise a reflective element.

According to yet another aspect of the present disclosure, there is provided a system for protecting an optical link. The system comprises apparatus as described above and a second apparatus as described above.

According to still another aspect of the present disclosure, there is provided an optical network. The optical network comprises an optical link, a further optical link, and a system for protecting the optical link as described above. The first port of the apparatus is coupled to a first end of the optical link, the second port of the apparatus is coupled to a first end of the further optical link, the fourth port of the second apparatus is coupled to a second end of the optical link, and the fifth port of the second apparatus is coupled to a second end of the further optical link. In an embodiment, the optical network may be a passive optical network.

According to yet another aspect of the present disclosure, there is also provided a radio access network comprising the optical network.

BRIEF DESCRIPTION OF THE DRAWINGS

Embodiments of the present disclosure will now be described by way of example only with reference to the accompanying drawings, in which.

DETAILED DESCRIPTION

Embodiments of the present disclosure will now be described more fully hereinafter with reference to the accompanying drawings. These embodiments may, however, be embodied in many different forms and the scope of protection should not be construed as limited to the embodiments set forth herein; rather, these embodiments are provided for thoroughness and completeness, and to fully convey the scope of the disclosure to the skilled addressee. Like reference characters refer to like elements throughout.

Figure 3:
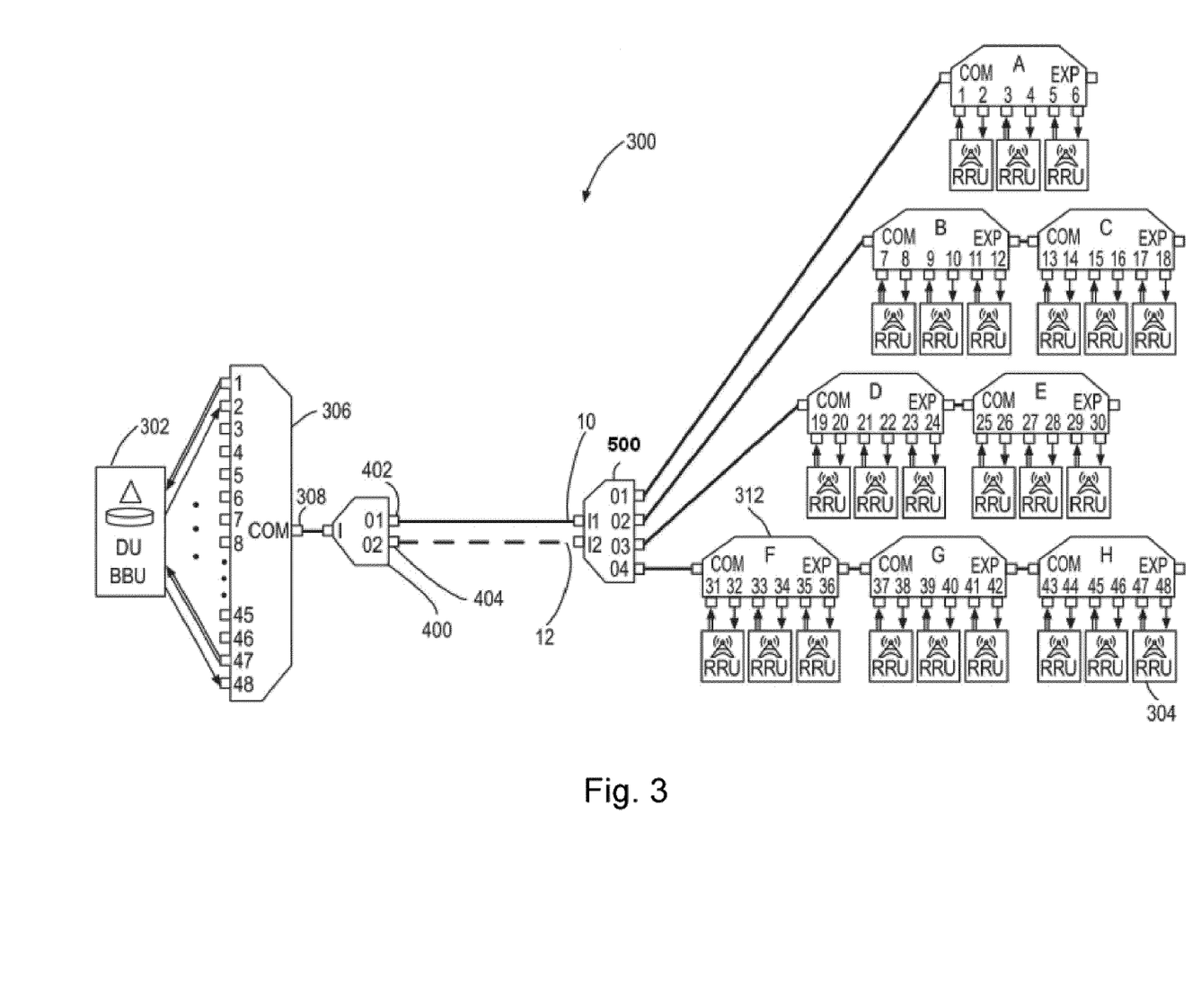
FIG. 3 shows an example of a radio access network comprising an optical network comprising apparatus for protecting an optical link and a second, remote apparatus for protecting the optical link, according to an embodiment of the present disclosure.

FIG. 3 shows, by way of example, apparatus 400 and a second, remote apparatus 500 embodying the present disclosure arranged to provide protection of an optical link 10 in an optical network within a radio access network 300. In this example, the optical network may be a passive optical network, PON. However, it should be appreciated that apparatus embodying the present disclosure may be used to protect an optical link, which is arranged to convey upstream and downstream signals, in any optical network. The optical link 10 may comprise an optical fibre.

In this example, the radio access network 300 is a front-haul network. The radio access network 300 comprises a baseband unit 302 configured to receive and transmit optical signals to and from a plurality of remote radio unit, RRUs 304, over the optical network.

The baseband unit 302 is coupled to a WDM multiplexer/demultiplexer 306, which is configured to receive each of the upstream optical signals transmitted by the baseband unit 302 and to multiplex the signals into a WDM signal, output from port 308. The WDM multiplexer/demultiplexer 306 is further configured to receive a WDM signal comprising the plurality of downstream optical signals, from the RRUs 304 at port 308, and to de-multiplex and output the respective downstream signals to the baseband unit 302.

It should be appreciated that in PON/front-haul networks the term "upstream" is generally used with respect to a direction from a remote site (e.g., the remote apparatus 500) to a main site (e.g., the apparatus 400), and "downstream" the opposite direction. However, in this context, the terms "upstream" and "downstream" are used from the perspective of the apparatus 400, for ease of description. That is, an optical signal is referred to as being "upstream" if it is destined for the remote apparatus 500 from the apparatus 400; otherwise, it is "downstream".

In this example, the apparatus 400 is arranged between the input/output 308 of the multiplexer/demultiplexer 306 and the optical link 10, which may be up to a few tenths of kilometers long. The apparatus 400 has a first port 402 coupled to the optical link 10, a second port 404 coupled to a further optical link 12 (which may be referred to as a protection link) and a further port, which in this example is coupled to output 308 of WDM multiplexer/demultiplexer.

In this example, the second apparatus 500 is configured to pass the upstream optical signals received over the optical link 10 (or potentially the further optical link 12) to a plurality of Optical Add Drop Multiplexers (OADMs) 312. In this example, each OADM 312 is coupled to a respective plurality of RRUs 304. Each RRU 304 is configured to receive an upstream optical signal dropped from the OADM 312 and to transmit a downstream optical signal. These downstream optical signals are passed by the respective OADM 312 to the second apparatus 500. The second apparatus 500 is configured to combine these downstream optical signals, received from the OADMs 312, and output these downstream optical signals for transmission over the optical link 10 and the further optical link 12.

Figure 4:
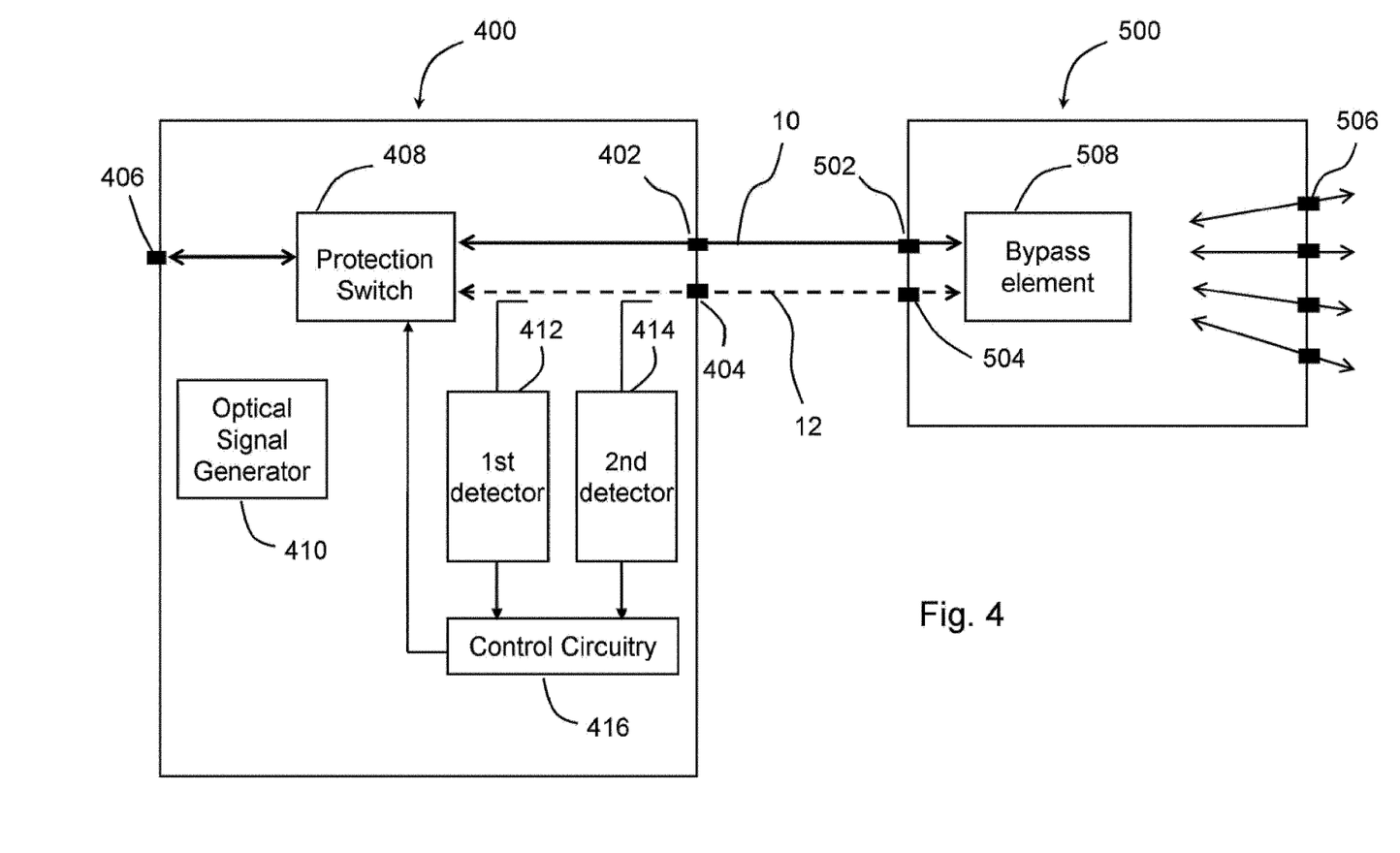
FIG. 4 is a schematic diagram showing a protection system comprising the apparatus for protecting an optical link and the second, remote apparatus for protecting the optical link, according to an embodiment of the present disclosure.

FIG. 4 shows a protection system comprising the apparatus 400 for protecting an optical link and the second, remote apparatus 500 for protecting the optical link, according to an embodiment of the present disclosure. In this example, the protection system is a 1+1 protection system. The apparatus 400 is coupled to one end of the optical link 10, and also to one end of the further optical link 12. The second apparatus is coupled to the other end of the optical link 10 and the further optical link 12. The second apparatus 500 may be a passive apparatus. Thus, advantageously, the protection system may be suitable for use in PON networks, and for example radio access networks such as front-haul networks.

In particular, the apparatus 400 has a first port 402, coupled to a first end of the optical link 10, and a second port 404, coupled to a first end of the further optical link 12. The optical link 10 and the further optical link 12 may each comprise an optical fibre. The apparatus 400 further comprises a third port 406, which, in use, receives upstream optical signals for transmission over the optical link 10 and outputs downstream optical signals received over the optical link 10. The apparatus 400 further comprises a protection switch 408, arranged between the third port 406 and the first port 402 and the second port 404. In "working mode", the protection switch 408 is arranged to couple the first port 402 to the third port 406. However the protection switch 408 is also operable to selectively couple the third port 406 to the second port 404 instead of to the first port 402.

The apparatus 400 further comprises an optical signal generator 410, configured to generate an upstream optical signal at a first wavelength (in this example, 1310 nm). At least when the third port 406 is coupled to the first port 402, this upstream optical signal is output from the first port 402, together with the other upstream optical signals. In this example, the optical signal generator 410 may be a laser. However, other types of optical signal generator may be used.

The apparatus 400 further comprises a first detector 412 coupled to the second port 404, and configured to selectively detect an optical signal at the first wavelength received at the second port 404. The apparatus 400 further comprises a second detector 414 coupled to the second port 404, and configured to selectively detect an optical signal at a second wavelength (in this example, 1550 nm), different from the first wavelength, received at the second port 404. In this example, at least one of the downstream optical signals received at the first port 402, and output from the third port 406, may also have this second wavelength.

The second, remote apparatus 500 receives the upstream optical signal having the first wavelength at a fourth port 502, coupled to the optical link 10. The second apparatus 500 further comprises a bypass element 508 arranged to selectively direct at least a portion of this upstream optical signal, whereby the upstream optical signal is transmitted from a fifth port 504, back to the apparatus 400 over the further optical link 12 (as a downstream optical signal at the first wavelength). The bypass element 508 acts to bridge the upstream optical signal having the first wavelength from the fourth port 502 to the fifth port 504. The other upstream optical signals, received by the second apparatus 500 at the fourth port 502, pass onto and are output from the second apparatus 500 at one or more sixth ports 506.

In addition, the second apparatus 500 is arranged to transmit a downstream optical signal at the second wavelength from the fifth port 504, over the further optical link 12. In this example, this downstream signal is received by the second apparatus 500 at at least one of the sixth ports 506. In fact, the "second wavelength" may be a wavelength band (i.e. may include a plurality of wavelengths) making up at least a portion of the spectrum used to transmit the downstream optical signals over the optical link 10.

In this embodiment where the protection system is a 1+1 protection scheme, in fact all of the downstream optical signals received at the second apparatus 500, at one or more sixth ports 506, for transmission over the optical link 10, are simultaneously transmitted from the fourth port 502 and from the fifth port 504. Of course, by virtue of the protection switch 408 at the apparatus 400, in "working mode" here when the first port 402 is coupled to the third port 406, only those received over the optical link 10 are output from the apparatus 400.

Thus, control circuitry 416 at the apparatus 400 can determine whether there is a fault on the optical link 10, based on whether the first and second detectors 412, 414 detect optical signals at the first and second wavelengths respectively. If an optical signal at the first wavelength is not detected at the first detector 412, then it can be deduced that there is a fault on one of the optical link 10 and the further optical link 12. However, it is not possible to know, from detection of the first wavelength alone, on which link the fault has occurred. If however, the optical signal at the second wavelength is detected, then it is known that the fault is not on the further optical link 12, which means the fault must be on the optical link 10. Thus, in this case, the control circuitry 416 may be triggered to cause the protection switch 408 to couple the third port 406 to the second port 404 instead of to the first port 402; i.e. to cause the upstream optical signals and the downstream optical signals to travel over the further optical link 12, instead of the optical link 10. In this example, the control circuitry 416 may comprise any type of circuitry, such as analogue or digital circuit components.

The control circuitry 406 can further determine that there is a fault on the further optical link 12 if: the first detector 412 does not detect an optical signal at the second port 404 having the first wavelength and the second detector 414 does not detect an optical signal at the second port 404 having the second wavelength. In this case, the control circuitry 416 may or may not be triggered to output an alarm indicating the fault on the further optical link 12.

Furthermore, if the first detector 412 detect an optical signal at the second port 404 having the first wavelength and the second detector 414 does not detect an optical signal at the second port 404 having the second wavelength, the control circuitry 416 can determine that there is no fault on the further optical link 12 and that no downstream optical signal having the second wavelength is received over the further optical link 12. In other words, the control circuitry 416 can determine that a missing signal is coming from the remote apparatus 500 (the second wavelength, i.e. the traffic, is missing). This may be caused by a remote laser failure or other failures on the remote system. Thus, troubleshooting the optical network becomes easier.

Figure 5:
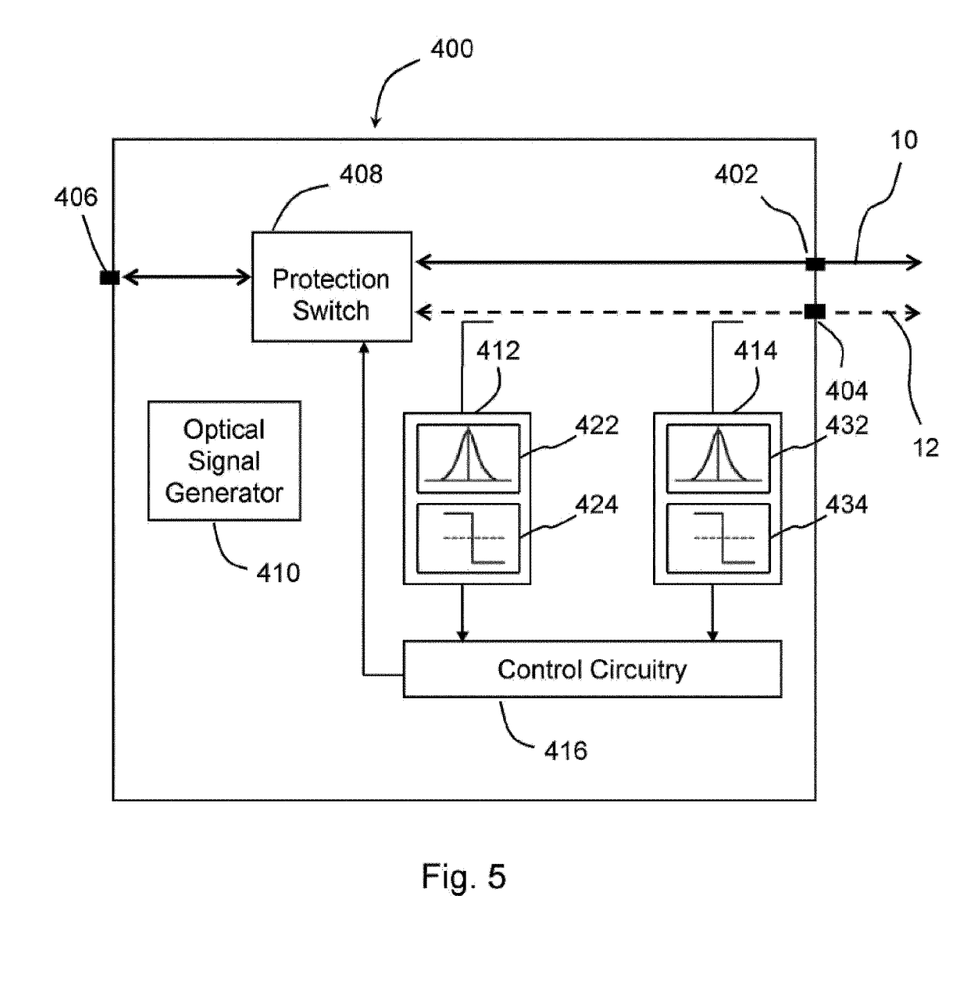
FIG. 5 is a schematic diagram showing the apparatus for protecting an optical link according to an embodiment of the present disclosure.

FIG. 5 shows the apparatus 400 for protecting an optical link according to an embodiment of the present disclosure. Some details of the apparatus 400 have been described above with respect to FIGS. 3 and 4, and thus are not discussed here for simplicity.

In this example, the first detector 412 comprises a first wavelength filter 422 configured to selectively filter the first wavelength and a first optical power detector 424. Similarly, the second detector 414 comprises a second wavelength filter 432 configured to selectively filter the second wavelength and a second optical power detector 434. The optical power detectors 424, 434 are arranged to receive the optical signals passed by the respective wavelength filters 422, 432, and to detect the presence or LOS (Loss of Signal) of the optical signal at the first wavelength and at the second wavelength, respectively. The presence or LOS of the optical signal may be detected using an absolute threshold, or for example by a relative threshold crossing where the power delta between two conditions is measured instead of the absolute value. It should also be appreciated that in the case where the second wavelength is a wavelength band as described above, the second wavelength filter 432 may be a band-pass filter.

Figure 6:
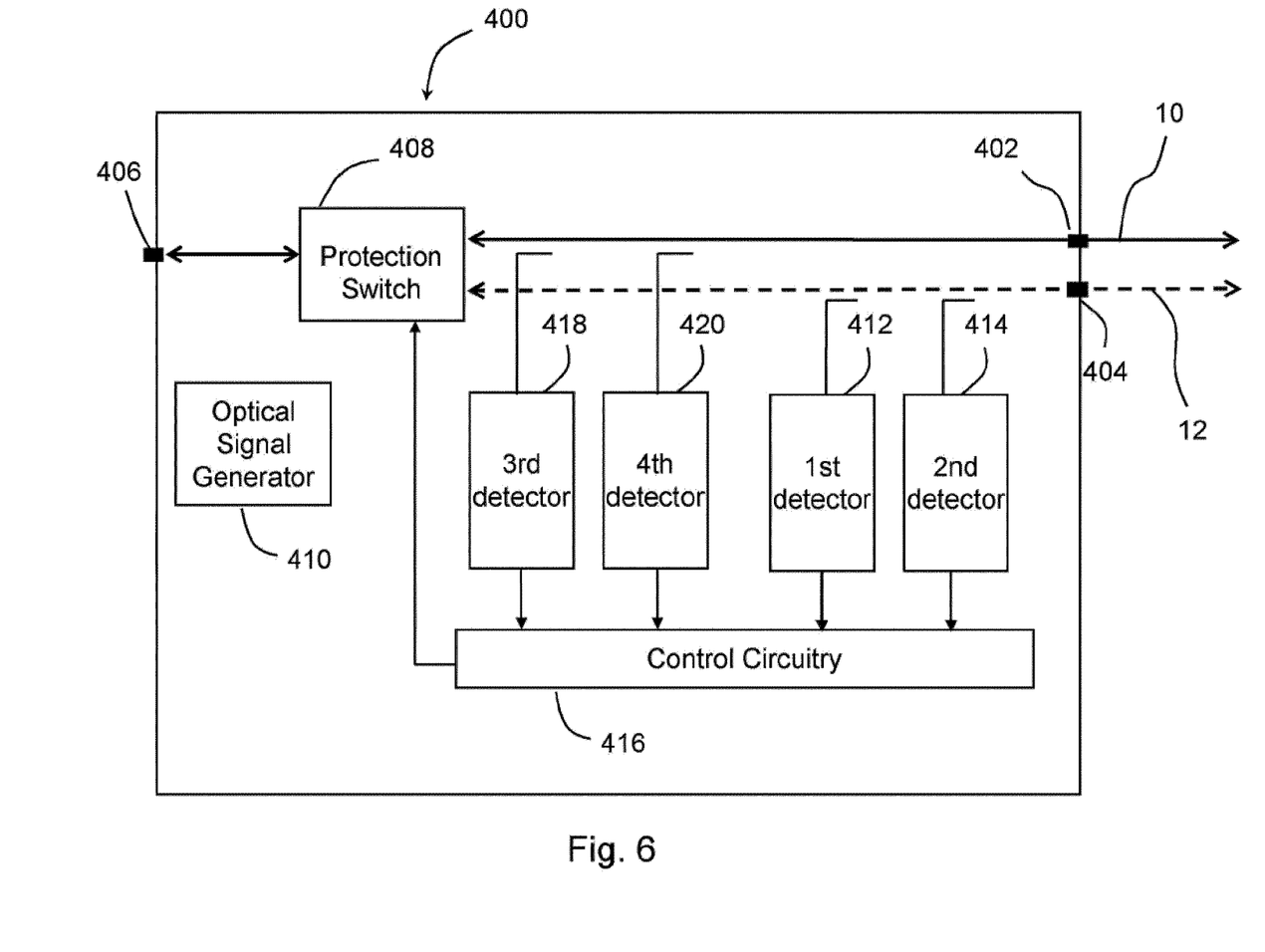
FIG. 6 is a schematic diagram showing the apparatus for protecting an optical link according to another embodiment of the present disclosure.

FIG. 6 shows the apparatus 400 for protecting an optical link according to another embodiment of the present disclosure.

In this example, the optical signal generator 410 is arranged in the apparatus 400 such that the upstream optical signal having the first wavelength passes via the protection switch 408, whereby, when the third port 406 is coupled to the second port 404 instead of the first port 402, the upstream optical signal is output from the second port 404. This means that, advantageously, the same upstream optical signal may be used to detect whether there is a fault on the optical link 10 (when the further optical link 12 is the "working link"). This may be advantageous if, after the optical link 10 is repaired, traffic is not automatically switched back onto the optical link 10. In this case, the optical link 10 may now be considered the "protection link".

In this example, the apparatus 400 further comprises a third detector 418 arranged to selectively detect a downstream optical signal received at the first port 402 having the first wavelength and a fourth detector 420 arranged to selectively detect a downstream optical signal received at the first port 402 having the second wavelength different from the first wavelength. The third detector 418 and the fourth detector 420 are not for monitoring for faults on the optical link 10. Instead, these detectors are for monitoring for faults on the further optical link 12, in the event that the further optical link 12 becomes the "working link". In this case, the control circuitry 416 is further arranged to cause the protection switch 408 to selectively couple the third port 406 to the first port 402 instead of to the second port 404 based on the detecting by the third detector 418 and the fourth detector 420. Details of the third detector 418 and the fourth detector 420, and actions performed by the control circuitry 416 based on the detecting of the third detector 418 and the fourth detector 420, are similar to those described above with respect to the first detector 412 and the second detector 414, and thus are not discussed here for simplicity.

Figure 7:
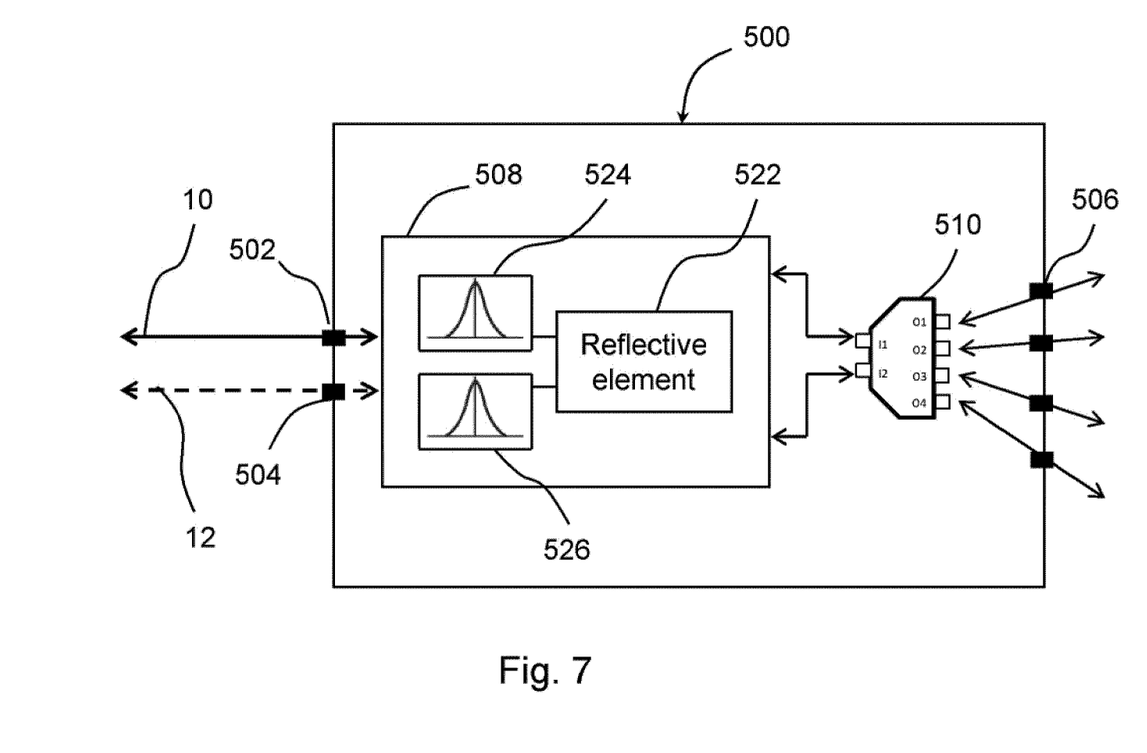
FIG. 7 is a schematic diagram showing the second, remote apparatus for protecting an optical link according to an embodiment of the present disclosure.

FIG. 7 shows the second, remote apparatus 500 for protecting an optical link according to an embodiment of the present disclosure. Some details of the second apparatus 500 have been described above with respect to FIGS. 3 and 4, and thus are not discussed here for simplicity.

The second apparatus 500 comprises a bypass element 508. As described above, the bypass element 508 is arranged to selectively direct at least a portion of the upstream optical signal having the first wavelength, whereby this upstream optical signal is transmitted from a fifth port 504, back to the apparatus 400 over the further optical link 12. In this example, the bypass element 508 may comprise a first wavelength filter 524 configured to selectively filter the first wavelength and a reflective element 522. Thus, "directing" the upstream optical signal comprises reflecting the upstream optical signal.

In the event that the further optical link 12 becomes the "working link" and hence the optical link 10 becomes the "protection link", the bypass element 508 may further comprise another first wavelength filter 526 configured to selectively filter the first wavelength from the upstream optical signals received at the fifth port 504 over the further optical link 12. In this case, the bypass element 508 is further arranged to selectively direct at least a portion of an upstream optical signal at the first wavelength, received at the fifth port 504, such that a downstream optical signal at the first wavelength is transmitted from the fourth port 502.

In this example, the second apparatus 500 may further comprise a power splitter 510. The power splitter 510 is configured to split the downstream optical signals received at the one or more sixth ports 506 such that the downstream optical signals are transmitted from the fifth port 504 as well as from the fourth port 502.

Advantageously, embodiments of the present disclosure enable protection of an optical link arranged to carry both upstream optical signals and downstream optical signals, in a cost effective and reliable manner—in particular since, as the detection of the downstream signals is over the "protection link" (whilst traffic is transmitted over the other, "working link"), this detection is advantageously not affected by upstream signal reflections.

Another advantage is that since we can 'choose' the first wavelength, we can select a wavelength in a different band from the downstream and upstream signals carrying traffic (such as e.g. 1310 nm). By way of example, and not limitation, the first wavelength in other embodiments could be 1610 nm or 1510 nm or any other wavelength outside the transmission bandwidth.

This makes the detector (e.g. the first detector 412, and potentially the third detector 418) much simpler and cheaper than the interleaver. Further, advantageously, the wavelength plan can be independent of the protection scheme.

The person skilled in the art realizes that the present disclosure by no means is limited to the embodiments described above. On the contrary, many modifications and variations are possible within the scope of the appended claims.

The invention claimed is:

1. A system for protecting an optical link, the system comprising:
a first apparatus for protecting an optical link arranged to carry upstream optical signals and downstream optical signals, the first apparatus comprising:
a first port for coupling to the optical link;
a second port for coupling to a further optical link;
a third port for receiving upstream optical signals for transmission over the optical link and for outputting downstream optical signals received over the optical link;
an optical signal generator arranged to generate an upstream optical signal having a first wavelength;
a protection switch operable to selectively couple the third port to the second port instead of to the first port, wherein when the third port is coupled to the first port, the first port is arranged to output the generated upstream optical signal;
a first detector arranged to selectively detect a downstream optical signal, having the first wavelength, that is received at the second port;
a second detector arranged to selectively detect a downstream optical signal, having a second wavelength different from the first wavelength, that is received at the second port; and
control circuitry coupled to the first detector, the second detector, and the protection switch, wherein the control circuitry is configured to control the protection switch, based on the selective detection of the downstream optical signal by the first detector and the second detector, couple the third port to the second port instead of to the first port, wherein the protection switch is configured to couple the third port to the first port in working mode;
the system further comprising a second apparatus for protecting the optical link, the second apparatus comprising:
a fourth port for coupling to an end of the optical link;
a fifth port for coupling to an end of a further optical link;
a bypass element arranged to selectively direct at least a portion of an upstream optical signal, having a first wavelength and received at the fourth port, such that a downstream optical signal having the first wavelength is transmitted from the fifth port;
one or more sixth ports configured to output upstream optical signals received over the optical link and to receive downstream optical signals, having at least a second wavelength different from the first wavelength, for transmission over the optical link; and
a power splitter configured to couple the downstream optical signals received at the sixth port for transmission at both the fourth port and fifth port.

2. The system according to claim 1, wherein the control circuitry of the first apparatus is configured to control the protection switch to selectively couple the third port to the second port instead of to the first port based on:
the first detector does not detect, at the second port, a downstream optical signal having the first wavelength; and
the second detector detects, at the second port, a downstream optical signal having the second wavelength.

3. The system according to claim 1, wherein the control circuitry of the first apparatus is further arranged to determine that there is a fault on the further optical link based on:
the first detector does not detect, at the second port, a downstream optical signal having the first wavelength; and
the second detector does not detect, at the second port, a downstream optical signal having the second wavelength.

4. The system according to claim 1, wherein the control circuitry of the first apparatus is further arranged to determine that there is no fault on the further optical link and that no downstream optical signal having the second wavelength is received over the further optical link based on:
the first detector detects, at the second port, a downstream optical signal having the first wavelength; and
the second detector does not detect, at the second port, a downstream optical signal having the second wavelength.

5. The system according to claim 1, wherein the first detector comprises: a first wavelength filter configured to selectively filter the first wavelength; and a first optical power detector.

6. The system according to claim 1, wherein the second detector comprises: a second wavelength filter configured to selectively filter the second wavelength; and a second optical power detector.

7. The system according to claim 1, wherein the optical signal generator is a laser.

8. The system according to claim 1, wherein the optical signal generator and the protection switch are further arranged such that when the third port is coupled to the second port instead of the first port, the generated upstream optical signal is output from the second port.

9. The system according to claim 1, further comprising:
a third detector arranged to selectively detect a downstream optical signal, received at the first port, having the first wavelength; and
a fourth detector arranged to selectively detect a downstream optical signal, received at the first port, having the second wavelength different from the first wavelength;
wherein the control circuitry is further coupled to the third detector and the fourth detector, and wherein the control circuitry is configured to control the protection switch, based on the selective detection of the downstream optical signal by the third detector and the fourth detector, to selectively couple the third port to the first port, instead of to the second port.

10. An optical network comprising:
an optical link;
a further optical link; and
a system for protecting the optical link according to claim 1, wherein:
the first port of the first apparatus is coupled to a first end of the optical link;
the second port of the first apparatus is coupled to a first end of the further optical link;
the fourth port of the second apparatus is coupled to a second end of the optical link; and
the fifth port of the second apparatus is coupled to a second end of the further optical link.

11. An optical network according to claim 10, wherein the optical network is a passive optical network.

12. A radio access network comprising an optical network according to claim 10.

13. A second apparatus for protecting an optical link arranged to carry upstream optical signals and downstream optical signals, the second apparatus comprising:
a fourth port for coupling to an end of the optical link;
a fifth port for coupling to an end of a further optical link;
a bypass element arranged to selectively direct at least a portion of an upstream optical signal, having a first wavelength and received at the fourth port, such that a downstream optical signal having the first wavelength is transmitted from the fifth port;
one or more sixth ports configured to output upstream optical signals received over the optical link and to receive downstream optical signals, having at least a second wavelength different from the first wavelength, for transmission over the optical link; and
a power splitter configured to couple the downstream optical signals received at the sixth port for transmission at both the fourth port and the fifth port.

14. The second apparatus according to claim 13, wherein the power splitter is configured to split the downstream optical signals received at the one or more sixth ports such that the downstream optical signals are transmitted from both the fifth port and the fourth port.

15. The second apparatus according to claim 13, wherein the bypass element is further arranged to selectively direct at least a portion of an upstream optical signal, having a first wavelength and received at the fifth port, such that a downstream optical signal at the first wavelength is transmitted from the fourth port.

16. The second apparatus according to claim 13, wherein the bypass element comprises a reflective element.

* * * * *